(12) United States Patent
Senn et al.

(10) Patent No.: US 10,966,808 B2
(45) Date of Patent: Apr. 6, 2021

(54) LIGHT-CURING DEVICE

(71) Applicant: Ivoclar Vivadent AG, Schaan (LI)

(72) Inventors: Bruno Senn, Gais (CH); Markus Pauler, Feldkirch (AT)

(73) Assignee: Ivoclar Vivadent AG, Schaan (LI)

( * ) Notice: Subject to any disclaimer, the term of this patent is extended or adjusted under 35 U.S.C. 154(b) by 429 days.

(21) Appl. No.: 15/748,823

(22) PCT Filed: Jul. 25, 2016

(86) PCT No.: PCT/EP2016/067665
§ 371 (c)(1),
(2) Date: Jan. 30, 2018

(87) PCT Pub. No.: WO2017/021190
PCT Pub. Date: Feb. 9, 2017

(65) Prior Publication Data
US 2018/0271631 A1   Sep. 27, 2018

(30) Foreign Application Priority Data

Jul. 31, 2015   (EP) ..................................... 15179313

(51) Int. Cl.
*A61C 19/00*   (2006.01)
*A61C 13/15*   (2006.01)

(52) U.S. Cl.
CPC .................................. *A61C 19/003* (2013.01)

(58) Field of Classification Search
CPC .............................. A61C 19/003; A61C 19/004
See application file for complete search history.

(56) References Cited

U.S. PATENT DOCUMENTS 5,634,711 A * 6/1997 Kennedy ................... A61N 5/06
362/119
5,660,461 A * 8/1997 Ignatius et al.
6,200,134 B1 * 3/2001 Kovac .................. A61C 19/004
433/29

(Continued)

FOREIGN PATENT DOCUMENTS

| CA | 2381792 A1 | 11/2002 |
| JP | 2004267437 A | 9/2004 |
| WO | 0233312 A2 | 4/2002 |

*Primary Examiner* — Ralph A Lewis
(74) *Attorney, Agent, or Firm* — Ann M. Knab; Thad McMurray

(57) ABSTRACT

The invention relates to a light-curing device, comprising a plurality of individual LED chips, each associated to a reflector, which LED chips are in particular each separately controllable and are arranged about a common central axis, in particular in each case at the same distance, and comprising reflection elements of the reflectors which adjoin one another, wherein the distance of the reflectors from one another is in each case substantially less, in particular less than a fifth, of the reflectors' diameter. The reflection elements (14, 16, 18, 20) are arranged like a clover leaf and are part of a common reflector body (10) which separates the reflection elements (14-20) from one another by means of dividing walls (30, 32, 34, 36), and the reflector body (10) has externally on the reflection elements (14-20) reinforcing walls (40) which—in relation to each cone (14, 16, 18, 20)—lie opposite the central axis (12).

24 Claims, 3 Drawing Sheets

(56) References Cited

U.S. PATENT DOCUMENTS

| | | | |
|---|---|---|---|
| 6,331,111 B1* | 12/2001 | Cao | A61C 19/004 362/119 |
| 6,719,558 B2* | 4/2004 | Cao | |
| 6,866,506 B2* | 3/2005 | Plank et al. | |
| 8,632,235 B2* | 1/2014 | Senn | |
| 2001/0046652 A1* | 11/2001 | Ostler | A61C 19/004 433/29 |
| 2011/0141733 A1* | 6/2011 | Senn | A61C 19/004 362/235 |

* cited by examiner

LIGHT-CURING DEVICE

CROSS-REFERENCE TO RELATED APPLICATIONS

This application is a National Stage application of International patent application PCT/EP2016/067665 filed on Jul. 25, 2016, which claims priority to European patent application No. 15179313.0 filed on Jul. 31, 2015, the disclosures of which are incorporated herein by reference in their entirety.

FIELD OF THE INVENTION

The invention relates to a light-curing device.

BACKGROUND OF THE INVENTION

Such a light-curing device has been known from EP 2 332 490. In such a light-curing device, a substrate is provided as a base for receiving LED chips. This is for heat dissipation, but also for mounting electrical connections with the LED chips.

Each chip comprises a reflection element, the chip extending towards the light output so starting from the chip in the manner known per se.

The chips heat up upon emission of light, which is accompanied by emission of heat, subsequently also heating the reflector body. It is possible for each of the reflectors to symmetrically expand via an expansion gap between the individual reflection elements is of the reflectors.

Basically, the solution to the problem is optically acceptable, but requires exact mounting to actually realize the gap provided in the sub-millimeter range between den reflectors. Moreover, this solution is highly complex, if significantly more than 3 LED chips are to be provided.

Therefore, reflector bodies have been suggested, extending hexagonally assembled to each other, to achieve maximum dense emission of light; in such a light-curing device, initially the assembly of chips is installed, and subsequently to this, the reflector body is superimposed in one step.

In addition, care must be taken herein for the orientation between reflector body and the individual LED chips is consistent per se.

It has also been suggested to provide individual single reflectors in substrate bodies consisting of metal. This on the one hand, results in that only minor deformations arise, which essentially do not affect the orientation of the optical axis of the individual reflectors. However, what is disadvantageous is the comparably high effort and the poor flexibility, since, for each light-curing device and/or each type of the light-curing device, a specific substrate body is required to be integrally fabricated, wherein, for chip-removing machining, typically two different types of machine tools are to be employed, i.e. a rotary machine and a milling machine. Notwithstanding, the quality of lathed reflectors is comparably poor, even if an appropriate protective coating layer is subsequently manufactured, for example by chrome-plating.

In regard of flexibility, but also quality of the reflection and optical orientation, solutions according to EP 2 332 491 are superior.

SUMMARY OF THE INVENTION

Contrary to this, the object of the invention is to provide a light-curing device which is further improved in flexibility, but yet having lower manufacturing cost, but at least constant optical quality.

The feature according to the invention, is related to the reinforcing walls or a reinforcing ring, which both surround a mutual reflector body having reflection elements. The reflection elements themselves are closely adjacent to each other, and may even intersect. By the annular, especially circular reinforcing wall it is virtually avoided for the reflection elements to displace "apart from each other" upon heating and the optical axes thereof to outwardly displace. The reinforcing wall, on the one hand, is reasonably spaced apart from the heat source LED chip, and, on the other hand, freely extends obliquely upwards into the space, so that some cooling effect is assured as well. The play slots according to EP 2 332 491 may be avoided without quality compromising, and the fabrication is significantly more cost effective, since instead of three injection molded parts, only one injection molded part is required to be fabricated.

Moreover, in one advantageous embodiment, also sensors are allowed to be installed especially favorably in the reflector body, and are installed at the outside corners of the dividing walls and/or between those walls and the reinforcing wall. There, always sufficient free space is available—no matter whether, for example, a three-leaf clover shape or a four-leaf clover shape will be selected for the assembly of the reflection elements, and the sensor openings that are provided between the reinforcing wall and the clover leaf, in addition allow air to enter, thus contributing to further cooling the reinforcing wall.

Even if herein a reinforcing wall is addressed as an essential element, it is understood that this wall is not required to drawn up to the level of the LED; in this respect, the reinforcing wall could also be referred to as a reinforcing ring, which preferably is flush with the top planes of the reflectors.

The annular embodiment having significantly reduced installation height compared to the dividing walls allows further thermal separation from the substrate and the LED chips as the heat sources.

The reflector body according to the invention is allowed to be fabricated comparably cost-effective and, in a manner known per se, is allowed to be mirrored after completion of the injection molding process. It furthermore is flexible, as the recesses provided, in a cost-effective version, for example allow only two opposite reflectors to be equipped with LED chips. For higher power, a third LED chip may be added, and for even more increased power, a fourth one may be added, for example having another emission wavelength.

In another configuration step, a central LED chip may also be added, i.e. in the center of the cloverleaf, below a respective passage recess. This LED chip may for example emit at an emission maximum that is different from the emission maximum of the remaining LED chips. In the maximum configuration step, sensors are then provided below the indentations of the clover leaf. Those are for absorbing radiation from the dental restoration part to be cured, or radiation reflected from other articles to favorably influence control of the light-curing devices in general.

Hence, in a four-leaf clover, for example three LED chips are allowed to be installed, emitting with high power and an emissions maximum in the blue light range, another LED chip is allowed to be installed in the fourth leaf of the clover leaf, which also emits with high power and having a violet emission maximum, and a fifth LED chip is allowed to be installed in the central opening, which emits in a green emission maximum, and having lower power.

In this respect, the solution according to the invention having the specified reflector body represents a flexible reflector body and is suitable for different light-curing devices and is of low cost.

In another advantageous embodiment, it is provided that collecting lenses are provided in each reflector or at least in one of the reflectors that each cover the LED chips. The collecting lenses may be realized such that they are mounted together with the associated LED chips already on the printed board, onto which printed circuit board the collecting lenses as well largely abut while surrounding the LED chip. The collecting lens then becomes comparably hot, even if it consists of plastics. In this context, it then is beneficial for the collecting lens to be separated from the associated reflector by a gap, which further helps in that the reflector only gets sparsely deformed.

BRIEF DESCRIPTION OF THE DRAWINGS

Further advantages, details and features will arise from the following description of a working example of the invention by way of the figures, wherein.

DETAILED DESCRIPTION

Figure 1:
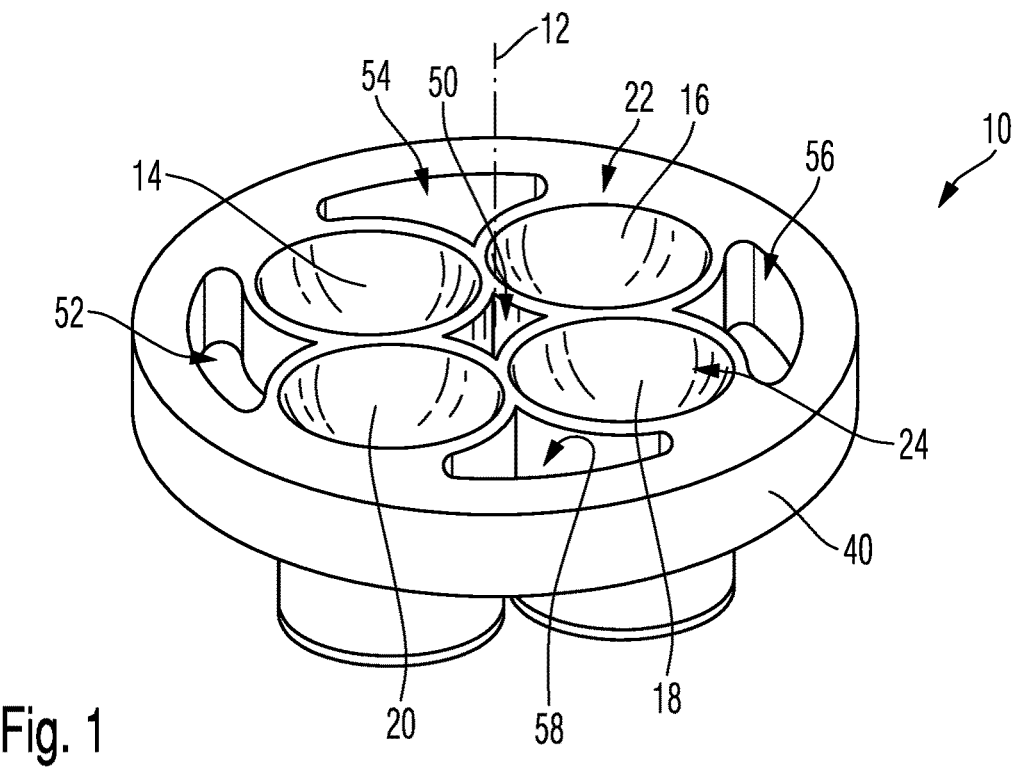
FIG. 1 is a schematic view of a light-curing device according to the invention in a detail, i.e. the reflector body according to the invention.

The reflector body 10 represented in FIG. 1 is part of a light-curing device otherwise not represented. The reflector body 10 preferably is made of black plastics and, at its inner surface at the reflection elements, is provided with a HR layer having high reflection effectivity. The HR layer is matched to the emitted wavelength. The reflector body 10 is located at the interface between light sources and a light guiding rod, as it is seen in more detail in FIG. 3, in the hand piece of the light-curing device.

In another embodiment, it is located at the tip of a rod, which is designed to be inserted in the mouth of a patient to therein emit light radiation for curing dental restorations, in front of the respective light sources that are mounted at the tip of the rod.

Basically, the reflector body 10 is circular-shaped, i.e. in reference to the outer shape, and in this respect extends about a central axis 12. It comprises a plurality of reflection elements, of which four reflection elements 14 to 20 are provided as an example, extending in a four-leaf clover style and being flush with a front face 22. In combination with associated collecting lenses, not represented in FIG. 1, each reflection element 14 to 20 forms a reflector, which herein is exemplified as reflector 24.

Figure 2:
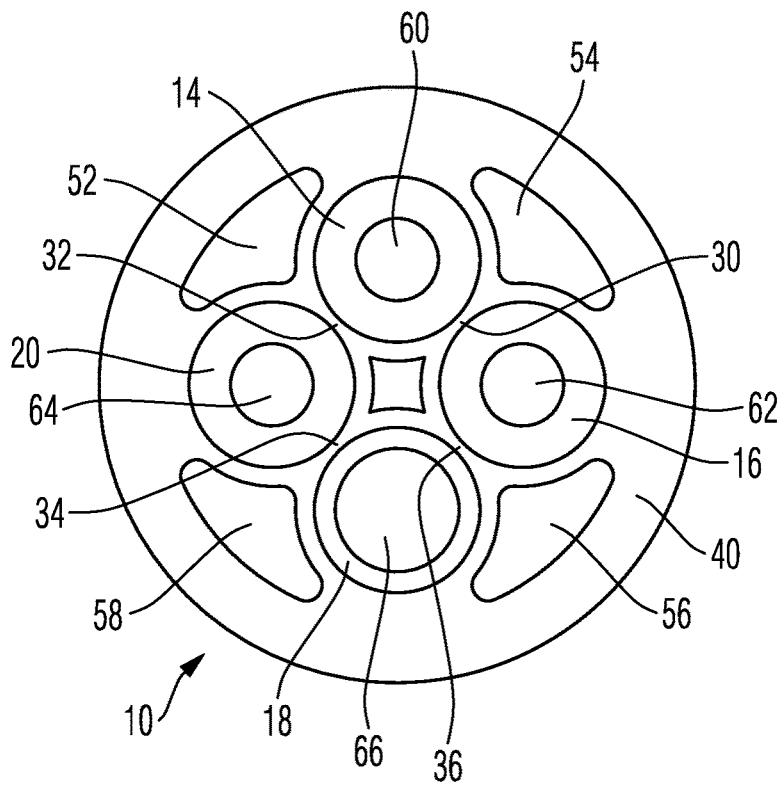
FIG. 2 shows the reflector body in the embodiment according to FIG. 1, but in a top view.

In the frontal view, the reflection elements 14 to 20 and consequently the associated reflectors 20, 22, 24 are formed as being evenly distributed, wherein reference is made to FIG. 2 showing the frontal view of the reflector body 10.

The reflectors and the associated reflection elements are adjacent to each other, but each are separated from each other via dividing walls 30, 32, 34 and 36. This means that the cones do not intersect each other, but are in close vicinity. Especially, the distance is significantly lower than the diameter of each cone at the front face 22.

According to the invention, all the reflectors and reflection elements are part of the mutual reflector body. This reflector body is surrounded by a reinforcing ring 40 which could also be considered as a reinforcing wall. The reinforcing ring 40 annularly extends around all reflection elements 14 to 20 and, in this respect, is externally adjacent to said reflection elements.

The strength of the reinforcing ring, as seen in radial direction, is significantly more than the strength of the dividing walls 30 to 36, for example fife times more. Moreover, it is between 50% and 100% of the radius of a reflection element, thus representing a solid ring, which keeps the reflector stable at the outside even upon deformation of the "interior life" thereof.

According to the invention, due to this configuration, it is possible with a one-piece reflector, to achieve almost the same elimination of the parallax error as in prior art.

Accordingly, the reinforcing ring 40 stiffens the thin-walled reflection element assembly such that the optical axes of the reflection elements do not diverge from each other, even upon heating the reflection elements.

In the embodiment represented in FIG. 1, a central breakthrough 50 is provided, which extends in the "middle" of the clover leaf about the central axis 12. This breakthrough is for passage of light from a central LED chip that may have an emission maximum in the green wavelength range.

The sub-wavelength range may selectively and favorably be green and may be used for position determination of the light-curing device depending on the reflexion outcome on a surface of a dental restoration.

Figure 4:
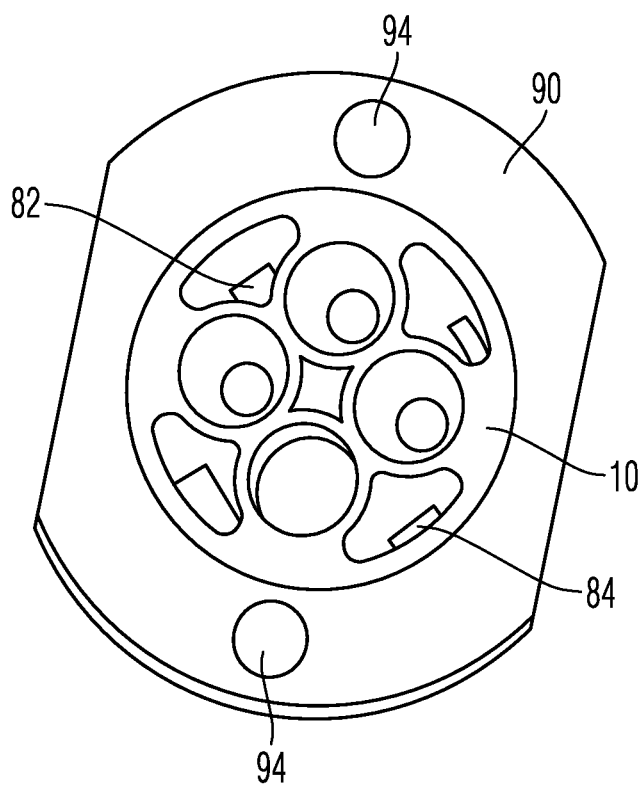
FIG. 4 shows the reflector body according to the invention, mounted onto a printed board.

In order to detect the reflected radiation sensors are provided, as can be seen from FIG. 4. Breakthroughs 52, 54, 56 and 58 are provided along the outer circumference of the reflector body 10, but within the reinforcing ring 40, to let light pass to the sensors. The breakthroughs 52 to 58 have the specific form as may be seen from FIGS. 1 and 2, which, on the one hand, leans against the outer circumference of the reflection elements, and on the other hand, leans against the inner circumference of the reinforcing ring 40.

In a modified embodiment, the reinforcing ring 40 is omitted in the region of the breakthroughs 52 to 58, so that multiple reinforcing walls 40 are present at the reflection elements 14 to 20, and, instead of the breakthroughs, indentations having incidentally the same form are provided.

It is seen from FIG. 2 that collecting lenses 60, 62 and 64 may be disposed in front of three LED chips in the associated reflection elements 14, 16 and 20, which are firm enough and extend in front of LED chips, which, in the major wavelength range, emit at a blue emission maximum.

The fourth LED chip emits in a wavelength range at an emission maximum that is in the violet wavelength range, and is covered by a collecting lens 66.

Figure 3:
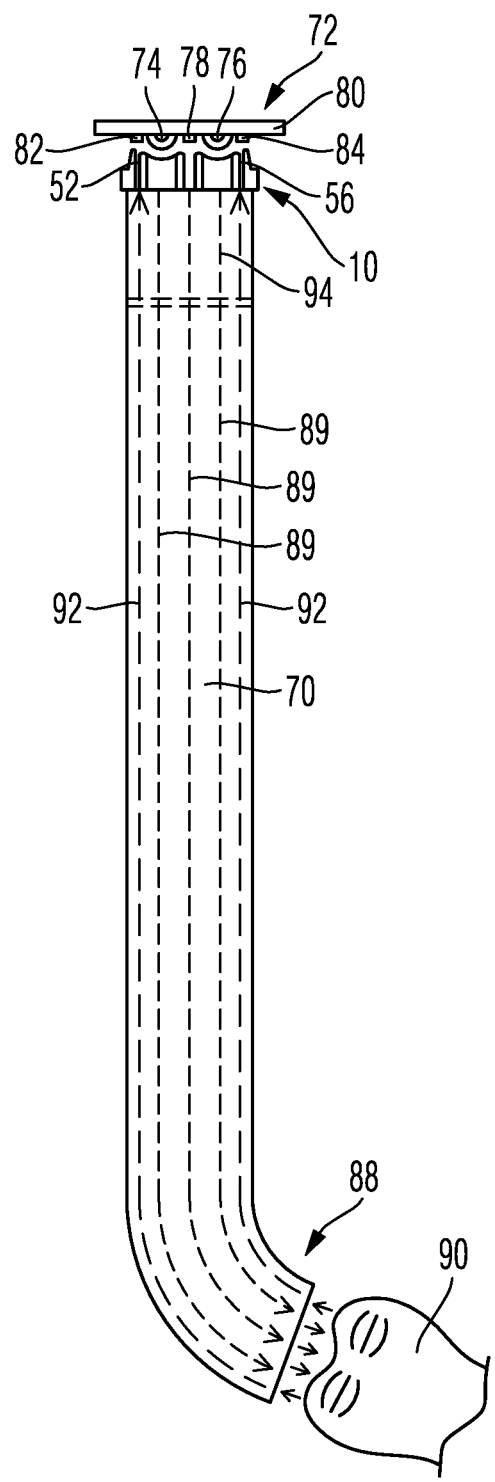
FIG. 3 shows another detail of a light-curing device according to the invention, i.e. the light guiding rod in combination with the light sources, the reflector body, and also in use with a dental restoration part.

It is seen from FIG. 3, how a light guiding rod 70 extends in front of a light source 72 that, among others, comprises LED chips 74 and 76.

The light source 72 also comprises the central LED chip 78 that extends in the middle of the clover leave assembly.

The LED chips are disposed on a through-plated printed circuit board 80. The printed circuit board 80 has a high portion of copper and thick through-platings, so that the heat may well be discharged to a non-represented cooling body.

Sensors are disposed at the outer circumference of the range of the light source 72, of which two sensors 82 and 84 are to be seen from FIG. 3. The sensors extend behind the breakthroughs 52 and 56.

As it is represented in FIG. 3 by a dotted line, the LED chips 74 to 78 emit emission light 89 to the distal end 88 of the light guiding rod 70. At that point, the emitted light leaves the light guiding rod 70, encountering a dental restoration part 90. therefrom, it is reflected at least partially. It re-enters the light guiding rod as a receiving light 92, and through the breakthroughs 52 and 56 is passed to the sensors 82 and 84, where analysis is performed.

If required, a light mixing body 94 incorporated in the light guiding rod 70 may be provided, which is arranged adjacent to the reflector body 10.

FIG. 4 shows a perspective view of the printed circuit board 80 having LED chips, sensors 82 and 84 as well as the reflector body 10 mounted thereon. The printed circuit board 70 is safely fastened at the light-curing device 80 via fastening holes 94.

Moreover, the light guiding rod 70 preferably is releasably mounted in the light curing device. This is done by way of known fastening clamping means, which are not represented herein, so that the light guiding rod, including the light mixing body is releasably and is autoclavable, as required.

Figure 5:
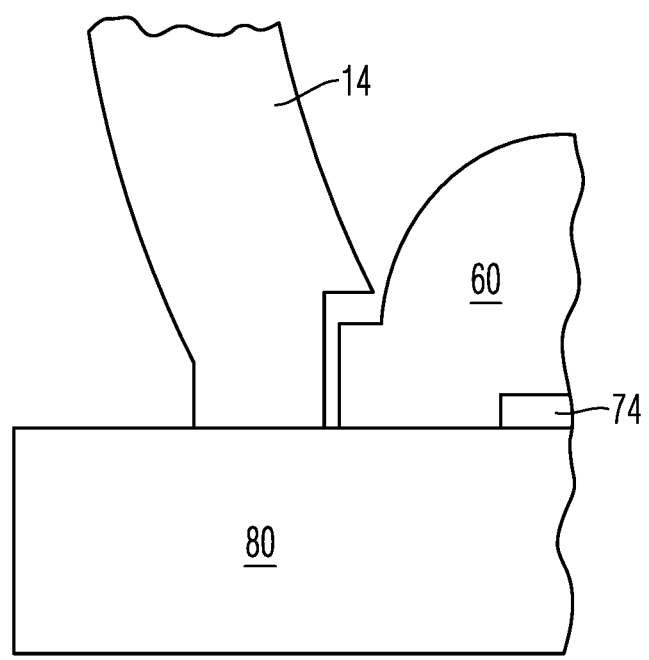
FIG. 5 shows a detail of the reflector body and the printed board.

In FIG. 5, part of a reflection element 14 is represented in combination with the associated collecting lens 60 and the associated LED chips 74. It may be seen that the reflector body 10 protrudes the circumference of the collecting lens 60. However, a gap 100 is selectively provided between the reflector body 14 and the collecting lens 60, the gap, in this respect, providing thermal insulation. Hence, the heat emitted around chip 74 is completely and predominantly discharged via the printed circuit board 80.

The invention claimed is:

1. A light-curing device comprising
a plurality of individual LED chips, each individual LED chip associated with a reflector,
the LED chips each being separately controllable and disposed about a mutual central axis, and each LED chip being disposed in an equal distance from each other, and
wherein the reflectors comprise reflection elements adjacent to each other, wherein distance of reflector elements from each other each is significantly less than a diameter of the reflector elements,
wherein the reflection elements (14, 16, 18, 20) are arranged and are part of a mutual reflector body (10), which separates the reflection elements (14-20) via dividing walls (30, 32, 34, 36) from each other, and
wherein the reflector body (10), externally of the reflection elements (14-20), comprises a continuous reinforcing ring (40), which, in relation to each reflection element (14, 16, 18, 20), extends around the reflection elements (14, 16, 18, 20).

2. The light-curing device according to claim 1,
wherein the reflector body (10) is designed in an elevated and one-piece manner in relation to the LED chips (74, 76, 78) and sensors (82, 84), which sensors are located proximate the LED chips.

3. The light-curing device according to claim 2,
wherein the reflector body (10) comprises breakthroughs (52-58) for accommodating the sensors (82, 84), said sensors are radial-outwardly confined by a rib of a cooling rib type.

4. The light-curing device according to claim 1,
wherein indentations or breakthroughs (52, 54, 56, 58) for accommodating sensors (82, 84) are disposed within the reinforcing ring (40).

5. The light-curing device according to claim 1,
wherein indentations or breakthroughs (52, 54, 56, 58) are disposed along the outer circumference of the reflector body (10), as seen in a top view of the reflector body (10) viewed from the central axis (12), wherein each dividing wall (30-36) symmetrically extends between the central axis (12) and the indentations.

6. The light-curing device according to claim 1,
wherein indentations or breakthroughs (52, 54, 56, 58) are formed outside of the reflector body (10), as seen in a top view of the reflector body (10) viewed from the central axis (12).

7. The light-curing device according to claim 1,
wherein the reflector body (10), in the region of the central axis (12), is formed such that the dividing walls (30-36) radially extend therefrom.

8. The light-curing device according to claim 1,
wherein the reflector body (10) is supported on a printed circuit board (80) via a limited number of fastening elements that at least partially penetrate the printed circuit board (80).

9. The light-curing device according to claim 8,
wherein the limited number of fastening elements comprises three fastening elements.

10. The light-curing device according to claim 1,
wherein each LED chip (74-78) is covered by a collecting lens, which extends on a printed circuit board (80) while surrounding the chip, and is supported on the printed circuit board.

11. The light-curing device according to claim 10,
wherein each collecting lens (60, 62, 64, 68) simultaneously also forms at least one guiding surface for the reflection element (14-20) of the reflector body (10) in an associated reflector (24).

12. The light-curing device according to claim 10,
wherein each collecting lens (60-66) of the LED chips (74-78) having a longer wavelength has a diameter that terminates within the reflector body (10) and each collecting lens (60-66) of the LED chips (74-78) having a shorter wavelength has a diameter that partially covers the reflection element (14-20).

13. The light-curing device according to claim 12,
wherein the longer wavelength comprises about 470 nm.

14. The light-curing device according to claim 1,
wherein the plurality of individual LED chips comprise three LED chips (74-78) disposed proximate to each other in a pattern of a shape of an equilateral and isosceles triangle,
wherein one of the three LED chips emits at shorter wavelength and second and third LED chips of the three emit at a longer wavelength.

15. The light-curing device according to claim 1,
wherein one reinforcing ring (40) comprises a supporting projection which outwardly extends from the reinforcing ring (40), and extends parallel to the central axis (12) and is supported on the printed circuit board (80).

16. The light-curing device according to claim 1,
wherein the reflector body (10) is thermally separated from the LED chips (74-78).

17. The light-curing device according to claim 1,
wherein the reflector body (10) comprises a central breakthrough (50), beneath which at least one of the plurality of individual LED chips (78) is disposed and has an emission spectrum in a sub-wavelength range.

18. The light-curing device according to claim 17, wherein the sub-wavelength range comprises a green wavelength range.

19. The light-curing device according to claim 1, wherein the LED chips that are disposed beneath the reflection elements (14-20) emit light in a major wavelength range, extending from blue to light blue, wherein three LED chips have an emission maximum at 470 nm and one LED chip has an emission maximum of 410 nm.

20. The light-curing device according to claim 4, wherein reflector walls are provided with a uniform wall strength towards the breakthroughs (52-58) for the sensors (82, 84) between one-twentieth and one-sixteenth of the reflector diameter at the upper end thereof.

21. The light-curing device according to claim 1, wherein the reflector body (10) comprises an outer wall, which annularly extends at the outside and which wall strength thereof is larger than, a wall strength of the reflector walls, which, at least partially, surround the reflection elements (14-20).

22. The light-curing device according to claim 1, wherein the reflector body (10) comprises a planer surface, and the reflector body (10) directly abutting, a light guiding rod (70).

23. The light-curing device according to claim 1, wherein each LED chip is disposed in an equal distance from each other, and
wherein the distance of reflector elements from each other each is less than one fifth of the diameter of the reflector elements
wherein the reflection elements (14, 16, 18, 20) are arranged in a clover leaf pattern.

24. The light-curing device according to claim 1, wherein the outer wall strength is at least twice as large as the wall strength of the reflector walls.

* * * * *